Patented Aug. 10, 1954

2,686,163

UNITED STATES PATENT OFFICE 2,686,163

RECLAIMING RUBBERS

George E. P. Smith, Jr., and Robert B. Bennett, Akron, Ohio, assignors to The Firestone Tire & Rubber Company, Akron, Ohio, a corporation of Ohio No Drawing. Application April 2, 1952, Serial No. 280,176

6 Claims. (Cl. 260—2.3)

This invention relates to the reclaiming of vulcanized conjugated diene polymer compositions.

"Conjugated diene polymer compositions" as used herein is meant to include natural rubber, copolymers of butadiene and styrene, copolymers of butadiene and acrylonitrile, 2-chlorobutadiene polymers, polybutadiene and other copolymerizates of 1,3-butadiene, isoprene or chloroprene with a polymerizable ethylene derivative as well as mixtures of two or more of these polymers.

"Reclaiming" as used herein may be understood to means treating or processing waste vulcanized materials of the class broadly outlined above in such a manner as to obtain products which are plastic and processable and thus capable of again being used to produce new articles of manufacture.

Reclaiming is conventionally effected by subjecting vulcanizates of conjugated diene polymer compositions to elevated temperatures as for example by heating as in a "digester" or "heater" or by mechanically working as on a mill or in a Banbury or the like. In the digester process a ground vulcanizate is heated in a closed vessel under pressure in the presence of water and/or a cellulose destroying chemical until any fiber contained in the vulcanizate is wholly or partially destroyed and the vulcanizate is sufficiently plasticized to be processable and workable. The plasticized material is then washed, dried and milled.

The cellulose destroying chemicals utilized are usually either of a neutral or caustic nature. Examples of neutral cellulose destroying chemicals are zinc chloride, calcium chloride and the like. If no cellulose is contained in a scrap, of course no cellulose destroying chemical need be used in the reclaiming process and any such process may be termed a neutral process. Examples of caustic cellulose destroying chemicals are sodium hydroxide, potassium hydroxide, the other alkali metal hydroxides and other caustic chemicals.

In the heater process, ground vulcanizate is heated in an autoclave by live steam until the vulcanizate becomes plastic and workable. The plasticized vulcanizate is then removed from the autoclave, dried and milled. If the scrap contains cellulosics a cellulose destroying chemical can be utilized in the heater process. In the various mechanical reclaiming processes, scrap vulcanizate is worked at high temperatures on a mill, in a Banbury or the like until the vulcanizate has reached the desired state of plasticity.

While heat alone, under the conditions outlined above in the description of conventional reclaiming processes, is sufficient for reclaiming vulcanized natural rubber, it has been found advantageous to mix various oils, tars and resins with the vulcanized natural rubber to facilitate the reclaiming process. The oils and resins useful for this purpose are those which behave as swelling agents, plasticizers or tackifiers and are illustrated by the solvent naphthas, turpentine, dipentene, asphalt, pine tar, rosin, coumarone resins, rosin oil and the like. Although these oils and resins assist in softening scrap rubbers, they deleteriously affect the physical properties of a reclaim if they are used in large amounts. Particularly large amounts of such oils and resins are required to produce workable products from the various so-called vulcanized synethetic rubbers such as GR-S (rubbery copolymer of 1,3-butadiene and styrene), GR-A or N-type rubber (rubbery copolymer of 1,3-butadiene and acrylonitrile), GR-M or neoprene (polychloroprene) and the like. The resultant products from the synthetic rubber vulcanizates treated in this manner only, therefore, have poor physical properties.

An often used measure of the quality of a reclaimed rubber is the acetone extract of the reclaim. A reclaimed rubber having a high rubber hydrocarbon content and consequently desirable physical properties is indicated by a reclaimed rubber having a low acetone extract. Conversely, a reclaimed rubber having a high acetone extract may be expected to contain large amounts of non-vulcanizable, non-rubber constituents, and to have poor properties. The usual reclaiming oils and resins mentioned above contribute a major proportion of the acetone extract of a reclaimed rubber.

For many purposes it is desirable to have an essentially non-staining reclaim. By non-staining is meant a reclaim which exhibits essentially no tendency to stain light colored compositions in contact with the reclaimed rubber or in contact with a composition containing the reclaimed rubber. This is particularly true where, for example, it is desired to use reclaimed rubber in a tire body or tread portion of a white sidewall tire. Other examples of instances where an essentially non-staining reclaim may be desirably used are in light colored rubber auto mats, in light colored rubber grommets, in light colored sealing strips for auto windows, in sealing strips for enameled ware such as refrigerators, stoves and the like and in any other rubber composition where migration of staining materials is undesirable.

An object, therefore, is to provide a class of chemical compounds of particular utility in reclaiming vulcanized rubbers. Another object of the invention is to provide an improved method of reclaiming vulcanized conjugated diene polymer compositions. Another object is to provide improved reclaimed vulcanizates of conjugated diene polymer compositions which have essentially no tendency to stain light colored compositions. A still further object is to provide a method of reclaiming vulcanized conjugated diene polymer compositions requiring less of the usual reclaiming oils, tars and other solvent type softeners, thereby producing reclaimed vulcanizates exhibiting particularly low acetone extracts. Another object is to provide an improved method of reclaiming vulcanized synthetic rubbers or mixtures of vulcanized synthetic and natural rubbers. Another object is to provide a class of chemicals which in relatively small amounts are effective in reclaiming vulcanized conjugated diene polymer compositions in a caustic process as well as in a neutral process.

The above and further objects are obtained in accordance with the invention by heating a vulcanized conjugated diene polymer composition in the presence of relatively small quantities of a member from each of two classes of amino compounds hereafter designated as classes A and B.

The amino compounds of class A are the aliphatic amines having eight and more carbon atoms. Examples of such amines are octyl amine, nonyl amine, decyl amine, lauryl amine, myristyl amine, cetyl amine, octadecyl amine, the various aliphatic polyamines and the like. The aliphatic amines of class A preferably include not only the free amines themselves but any salt of the free amines derived from the aliphatic carboxylic acids such as caprylic acid, nonylic acid, capric acid, palmitic acid, stearic acid and the like, the cycloaliphatic carboxylic acids such as the naphthenic acids and the like and heterocyclic carboxylic acids such as furoic acid and the like. Although the amines outlined above are, in the practice of the invention, usually utilized in the form of the free amine or in the form of the organic acid salts above described, they also exhibit desirable results in accordance with the invention when introduced into a reclaiming recipe in any form. For example, the amines of class A are also used in the practice of the invention in the form of inorganic salts such as the amine chlorides, sulfates and the like or even as metallic salt complexes such as those formed by reacting the amines with zinc chloride and the like.

The amino compounds of class B are the sulfides of a N,N-di-(non-benzenoid substituent) aromatic amine. The two non-benzenoid substituents on the nitrogen of the aromatic amine are aliphatic, cycloaliphatic, or together they constitute a cyclo-alkylene radical or a cyclo-dialkylene-oxy radical thus forming a non-benzenoid ring with the nitrogen. The two non-benzenoid substituents are similar or dissimilar. Examples of aliphatic substituents are methyl, ethyl, propyl, butyl, amyl, hexyl, heptyl, octyl, decyl, dodecyl, benzyl, chloroethyl, bromo-isopropyl, nitrophenylethyl and similar radicals. Examples of cycloaliphatic substituents include cyclohexyl and methyl-cyclohexyl radicals. Examples of cyclo-alkylene radicals include cyclopentamethylene, methyl - cyclopentamethylene and cyclo-hexamethylene radicals. Examples of cyclo-di-alkylene-oxy radicals include cyclodiethylene-oxy and methyl-cyclodiethylene-oxy radicals.

The sulfides of class B are those wherein two or more molecules of an aromatic amine defined above are joined by one or more sulfur bridges connecting the aromatic rings. These sulfides are represented structurally by the following general formula:

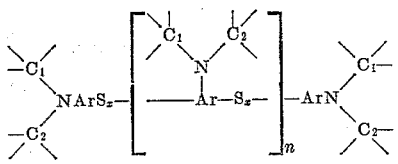

wherein $x$ is an integer from 1 to 4 and $n$ is any whole number including zero, Ar is an aromatic radical and $C_1$ and $C_2$ are carbon atoms included in aliphatic or cycloaliphatic radicals or both together are part of a non-benzenoid ring.

The aromatic amine sulfides of class B may be conveniently prepared by reacting in a suitable solvent a sulfur halide with an aromatic amine having the formula:

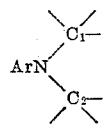

wherein Ar is an aromatic radical and $C_1$ and $C_2$ are carbon atoms included in aliphatic or cycloaliphatic radicals or both together are part of a non-benzenoid ring. The aromatic radical may be a benzenoid radical such as phenyl, naphthyl, anthracyl, biphenyl, terphenyl, phenanthryl and similar radicals or it may be a partially hydrogenated benzenoid radical such as tetrahydronaphthyl and like radicals wherein at least the benzene ring carrying the amino group is not hydrogenated. The aromatic radical may, but need not be, ring-substituted as with one or more halogen atoms, nitro groups, alkyl groups, cycloalkyl groups or alkoxy groups as long as at least one position ortho or para to the amino group is open for a sulfur linkage.

Either a mono halide or a di-halide may be used. The aromatic amine may be reacted with the sulfur halide in a mole ratio respectively of about 2:1 to form a bis(aromatic amine) sulfide. This ratio is, however, not critical since the resinous sulfides formed by reacting an excess of sulfur halide with the aromatic amine are also active reclaiming agents and included within the contemplation of the invention. While the aromatic amine sulfides of the invention are conveniently prepared by the sulfur halide reaction just outlined, their activity is not dependent upon their mode of preparation. They may, for example, also be prepared by heating a desired aromatic amine in the presence of free sulfur.

Illustrations of compounds of class B are the sulfides of:

N,N-di-methylaniline
N,N-di-ethylaniline
N,N-di-n-propylaniline
N,N-di-n-butylaniline
N,N-di-n-amylaniline
N,N-di-methyl-o-toluidine
N,N-di-methyl-m-toluidine
N,N-di-methyl-p-toluidine N,N-di-n-butyl-o-toluidine
N,N-di-n-butyl-m-toluidine
N,N-di-n-butyl-p-toluidine
N,N-di-n-butyl-o-anisidine
N,N-di-n-butyl-o-phenetidine
N,N-di-n-butyl-2,5-dimethylaniline
N,N-di-n-butyl-$a$-naphthylamine
N,N-di-n-butyl-$\beta$-naphthylamine
N,N-di-n-butyl-m-chloroaniline
N,N-di-n-butyl-3,5-dimethylaniline
N,N-di-n-butyl-2-methyl-5-chloroaniline
N,N-di-n-butyl-2-methyl-4-chloroaniline
N,N-di-n-propyl-m-toluidine
N,N-di-n-heptyl-m-toluidine
N,N-di-n-butyl-ar-1,2,3,4 - tetrahydronaphthylamine
N,N-di-n-butyl-ethyl-naphthylamine
N,N-di-n-butyl-2,4,5-trimethylaniline
N,N-di-n-butyl-p-tert-amylaniline
N,N-di-n-butyl-di-tert-amylaniline
N,N-di-n-butyl-2,3,5,6-tetramethylaniline
N,N-di-n-butyl-2,3,4,5-tetramethylaniline
1-di-n-butylamino-2-methylnaphthalene
1-di-n-butylamino-4-methylnaphthalene
1-di-n-butylamino-3-methylnaphthalene
N,N-di-n-butyl-m-trifluoromethylaniline
N,N-di-n-butyl-3,5-dibromoaniline
N-benzyl-N-ethyl-m-toluidine
N,N-di-isopropylaniline
N,N-di-sec-butyl-m-toluidine
N,N-di-t-butylaniline
N-methyl-N-sec-amylaniline
N-methyl-N-sec-amyl-m-toluidine
N-methyl-N-dodecylaniline
N,N-di-2-ethylhexylaniline
N-ethyl-N-tt-octylaniline
N-methyl-N-nonylaniline
N,N-di-ethyl-m-ethylaniline
N,N-di-n-amyl-3,5-diethylaniline
N,N-di-n-amyl-2,4-diethylaniline
N,N-di-n-amyl-m-nitroaniline
2-di-n-butylamino-4-methylnaphthalene
2-di-n-butylamino-8-methylnaphthalene
N,N-di-n-butyl-4-($a$-methylbenzyl) aniline
Methylated $a$-pinene aniline
N-cyclohexyl-N-butylaniline
N,N-di-cyclohexylaniline
N-phenylmorpholine
N-phenylpiperidine The procedure utilized in obtaining the evaluations of the examples of the invention set out hereafter involve generally the heating of a ground vulcanizate in the presence of a relatively small amount of a compound of class A, described above, and a relatively small amount of a compound of class B, also described above. The resulting material is then dried, cooled, mill-massed and subjected to three refining passes through a roll mill equipped with a refiner knife and set so that a piece of soft lead passed between the rolls will have a thickness of 0.005 inch. After the third refining pass, the thickness of the sheet is measured. The thickness of a sheeted reclaim product is a function of the softness of the reclaimed product—the greater the thickness, the less the softening, and conversely the less the thickness, the greater the softening. Also after the third pass qualitative observation of the tack and general suitability of the sheeted reclaim product is made.

Example 1

As an illustration of the practice of the invention a mixture of the following ingredients is heated at 375° F. for 12 hours in an autoclave:

| | Parts by weight |
|---|---|
| GR–S tread scrap (ground to 5 mesh) | 100.0 |
| Calcium chloride | 2.0 |
| Water | 190.0 |
| Dipentene | 24.0 |
| Aliphatic amine stearate [1] | 12.0 |
| N,N-di-n-butyl-m-toluidine sulfide [2] | 0.6 |

[1] Resulting from the mixture of a molecular equivalent of stearic acid with Alkylamine 81. Alkylamine 81 is a blend of $C_{12}$ through $C_{15}$ branched-chain aliphatic amines supplied by Rohm and Haas Company.
[2] The reaction product obtained by reacting about 2 moles of the amine with about 1 mole of sulfur monochloride.

The heated material is then dried, cooled, mill-massed and subjected to three refining passes. The reclaimed vulcanizate has a thickness of 0.005 inch and good tack and body. The reclaim is also essentially non-staining and has a low acetone extract.

Example 2

Another mixture in accordance with the invention having the same ingredients as Example 1 is heated for 12 hours at 375° F. The proportions of ingredients vary from the proportions of Example 1 only in the use of 0.3 part rather than 0.6 part by weight of the aromatic amine sulfide. When the heated material is further treated in accordance with the procedure of Example 1, a reclaimed sheet results having a thickness of 0.006 inch, good tack and body. Here too, the reclaim is essentially non-staining and has a low acetone extract.

Example 3

Another scrap mixture in accordance with the invention differs from Example 2 only in the use of 15 parts instead of 12 parts by weight of the aliphatic amine stearate of Examples 1 and 2. When this mixture is subjected to the heating and further treatment of the preceding examples, a refined, reclaimed sheet results having a thickness of 0.004 inch, good tack and good body. This reclaim is also essentially non-staining and has a low acetone extract.

Example 4

Another scrap mixture in accordance with the invention differs from Example 3 only in the use of 30 parts rather than 24 parts of dipentene. When this mixture is subjected to the reclaiming conditions of the previous examples a reclaimed sheet having a thickness of 0.003 inch, good tack and body results. This reclaim is also essentially non-staining and has a low acetone extract.

Example 5

As an illustration of the practice of the invention in a caustic process, as distinguished from the neutral process used in the previous examples, the following scrap mixture is cooked for 12 hours in an autoclave at 375° F.

| | Parts by weight |
|---|---|
| GR–S tread scrap (ground to 5 mesh) | 100.0 |
| Sodium hydroxide (3% aqueous solution) | 136.0 |
| Dipentene | 25.0 |
| Aliphatic amine [1] | 2.0 |
| Stearic acid | 3.0 |
| N,N-di-n-butyl-m-toluidine sulfide | 1.5 |

[1] A mixture of $C_{12}$ to $C_{15}$ aliphatic amines supplied by Rohm and Haas Company as Alkylamine 81.

The cooked mixture is then washed, cooled, mill-massed and subjected to three refining passes as were the materials of the preceding examples. An essentially non-staining reclaimed rubber results having a low acetone extract and a thickness of 0.007 inch. While this reclaim is not as tacky as the reclaims of the preceding examples, it is nevertheless satisfactory. In a caustic process it is believed that the aliphatic acid is washed out. While the presence of an aliphatic acid has no deleterious effect in a caustic process it is believed not to contribute as appreciably to the reclaiming process as it does in a neutral process.

*Example 6*

Another scrap mixture in accordance with the invention differs only from Example 5 in the proportions of ingredients used which are:

| | Parts by weight |
|---|---|
| GR–S tread scrap (ground to 5 mesh) | 100.0 |
| Sodium hydroxide (3% aqueous solution) | 136.0 |
| Dipentene | 25.0 |
| Alkylamine 81 | 4.0 |
| Stearic acid | 6.0 |
| N,N-di-n-butyl-m-toluidine sulfide | 1.0 |

When this mixture is treated according to the procedure of Example 5, an essentially no-staining reclaim results having a low acetone extract and a thickness of 0.008 inch. The other properties of the reclaim are comparable to Example 5.

*Example 7*

Another scrap mixture in accordance with the invention, having the ingredients set out as follows, is subjected to the same heating and other treatment used in Examples 5 and 6.

| | Parts by weight |
|---|---|
| GR–S tread scrap (ground to 5 mesh) | 100.0 |
| Sodium hydroxide (3% aqueous solution) | 136.0 |
| Dipentene | 25.0 |
| Alkylamine 81 | 10.0 |
| N,N-di-n-butyl-m-toluidine sulfide | 1.0 |

The resulting reclaim has a thickness of 0.006 inch and has better body and tack than the reclaims of Examples 5 and 6. This reclaim also is essentially non-staining and has a low acetone extract.

*Example 8*

Another mixture in accordance with the invention differs from Example 7 only in having 5 instead of 10 parts of Alkylamine 81 and 2.0 instead of 1.0 part of the aromatic amine sulfide. When this mixture is treated according to the procedure of Example 7, a reclaim results having a thickness of 0.008 inch and other properties comparable to the reclaim of Example 7.

*Example 9*

Another scrap mixture in accordance with the invention differs from Example 7 only in having 0.5 additional part by weight of the aromatic amine sulfide and in having 5 parts by weight of dodecylamine instead of the 10 parts of Alkylamine 81 used in Example 7. When this mixture is treated in accordance with the procedure of Example 7, a reclaim results having a thickness of about 0.010 inch and properties otherwise comparable to the reclaim of Example 7.

*Example 10*

Another scrap mixture, as follows, in accordance with the invention is heated 12 hours at 375° F. in an autoclave.

| | Parts by weight |
|---|---|
| Mixed scrap containing about 50% natural rubber and 50% GR–S rubber (ground to 5 mesh) | 100 |
| Sodium hydroxide (3% aqueous solution) | 136 |
| Dipentene | 10 |
| Alkylamine 81 | 1.0 |
| Stearic acid | 1.5 |
| N,N-di-n-butyl-m-toluidine sulfide | 0.2 |

The heated mixture is then washed, cooled, mill-massed and subjected to three refining passes as usual. The resulting reclaim has a thickness of 0.009 inch, has good tack and body, is essentially non-discoloring and has a very low acetone extract.

*Example 11*

Another scrap mixture in accordance with the invention differs only from that of Example 10 in that it contains 1.6 parts instead of 1.0 part of Alkylamine 81 and 2.4 parts instead of 1.5 parts of stearic acid. When this mixture is subjected to the same treatment used in Example 10, a reclaim having a thickness of 0.008 inch and other properties comparable to those of the reclaim of Example 10 results.

*Example 12*

Another mixture in accordance with the invention differs from Examples 10 and 11 only in the amounts of aliphatic amine, aliphatic acid and aromatic amine sulfide used. The amounts of these materials in the mixture of the present example are respectively 2.0, 2.0 and 0.1 parts by weight. When treated in accordance with the procedure of Examples 10 and 11 a reclaim results having properties comparable to the properties of the reclaim of Example 11.

*Example 13*

Another mixture in accordance with the invention is as follows:

| | Parts by weight |
|---|---|
| Mixed scrap containing about 50% natural rubber and 50% GR–S rubber (ground to 5 mesh) | 100 |
| Sodium hydroxide (3% aqueous solution) | 136 |
| Dipentene | 10 |
| Alkylamine 81 | 5.0 |
| N,N-di-n-butyl-m-toluidine sulfide | 0.75 |

When the above mixture is heated for 12 hours at 375° F. and further treated according to the procedure used in the previous examples, a reclaim results having a thickness of 0.006 inch, excellent tack and satisfactory body. The reclaim is essentially non-staining and has a low acetone extract.

*Example 14*

Still another mixture in accordance with the invention is the following:

| | Parts by weight |
|---|---|
| Natural rubber scrap (ground to 5 mesh) | 100.0 |
| Calcium chloride | 2.0 |
| Water | 190.0 |
| Dipentene | 10.0 |
| Aliphatic amine stearate [1] | 5.0 |
| N,N-di-n-butyl-m-toluidine sulfide | 0.075 |

[1] The same material used in Examples 1–4.

When the above mixture is heated for 12 hours at 375° F. and further treated according to the procedure of the previous examples, a reclaim results having a thickness of 0.003 inch, excellent tack and good body. The reclaim is essentially non-staining and has a low acetone extract.

It should be borne in mind that the above examples are illustrative of the invention and are not intended to limit the invention. The above and further tests, however, indicate that the aliphatic amines or aliphatic amine salts should ordinarily not be used in excess of about twenty-five parts by weight per one hundred parts of vulcanizate. The aromatic amine sulfides also should be used in relatively small amounts and preferably not more than about two and one half parts by weight per one hundred parts by weight of vulcanizate. If more than these preferred amounts are used, the resulting reclaim tends to be too soft to process, or to have more nearly an acetone extract presently conventional, or to stain light colored compositions in contact with it.

Very desirable results are obtained in accordance with the invention if in addition to a compound from each of the previously described classes of chemicals (i. e. class A and class B) a volatile swelling aid such as dipentene, an acid washed coal tar naphtha or xylene or other non-staining low boiling material is used which is mostly driven off during the reclaiming process. This last combination of materials assists greatly in producing reclaimed vulcanizates having particularly low acetone extracts.

The present invention includes not only the process of reclaiming vulcanized conjugated diene polymer composition by means of the reclaiming chemicals utilized but also the product obtained thereby. The reclaimed products of the invention not only have greatly improved properties but appear to have compositions differing considerably from those of previously known reclaim. There appears to be a chemical reaction between conjugated diene polymer compositions and at least some of the chemicals of the invention heated therewith.

Scrap vulcanized natural rubber, scrap vulcanized GR-S and mixed scraps containing both vulcanized natural and vulcanized GR-S are, at the present time, the materials usually desired to be reclaimed commercially in large quantities. The reclaiming agents of the invention are, however, not only very effective in reclaiming such vulcanizates but also are effective reclaiming agents for the other vulcanized conjugated diene polymer compositions such as neoprene, N-type rubbers, butyl rubber (rubbery copolymer of isobutylene and isoprene or butadiene) and the like. The conjugated diene polymer compositions, upon which the reclaiming agents are particularly effective, are usually those which have been vulcanized in the presence of sulfur or in the presence of sulfur-containing vulcanizing agents such as sulfur halides, polysulfides of phenols, cresols or amines, dialkyl xanthogen sulfides, tetraalkylthiuram sulfides and the like. The reclaiming agents of the invention, however, show demonstrable reclaiming activity on non-sulfur cured vulcanizates such as those obtained by curing in the presence of a metal oxide (notably the chlorobutadiene polymers), phenol-formaldehyde resins (notably the butadiene-acrylonitrile polymers), quinones, quinone dioximes, other quinone derivatives, nitroso compounds and other compounds known to vulcanise chemically unsaturated elastomers.

The temperatures and pressures used in the various examples also are not critical and are limited only by equipment and economic considerations. Temperatures have been varied over a range of from about 150° F. to 550° F. and steam under a gage pressure as high as 900 p. s. i. has been utilized. The invention may be employed in combination with any of the usual physical means used in reclaiming. As previously indicated one particular advantage of the invention resides in its effectiveness in a caustic process as well as in a neutral process. Other variations of the practice of the invention will occur naturally to those skilled in the art and are within the contemplations of the invention.

We claim:

1. A reclaimed vulcanized conjugated diene polymer composition produced by the process of claim 3.

2. A process of reclaiming a vulcanized conjugated diene polymer composition which comprises heating said composition in the presence of (A) a relatively small quantity of a primary aliphatic amine containing at least eight carbon atoms and (B) a relatively small quantity of an aromatic amine sulfide having the formula:

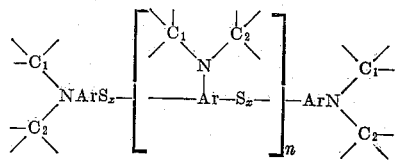

wherein Ar is an aromatic radical, N and S are directly connected to a ring of the aromatic radical, at least one position on said ring selected from positions ortho and para to N is open for sulfur linkage, $C_1$ and $C_2$ are carbon atoms included in radicals selected from the group consisting of (1) separate radicals selected from cycloaliphatic hydrocarbon radicals and aralkyl, halogenated alkyl and alkyl radicals and (2) a single radical selected from alkylene and oxygen-interrupted alkylene radicals containing both $C_1$ and $C_2$, $x$ is an integer from 1 to 4 and $n$ is any whole number including zero.

3. A process of reclaiming a vulcanized conjugated diene polymer composition which comprises heating said composition in the presence of caustic, (A) a relatively small quantity of a primary aliphatic amine containing at least eight carbon atoms and (B) a relatively small quantity of an aromatic amine sulfide having the formula:

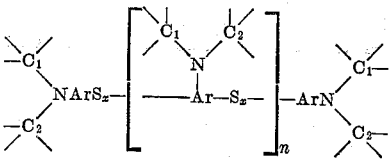

wherein Ar is an aromatic radical, N and S are directly connected to a ring of the aromatic radical, at least one position on said ring selected from positions ortho and para to N is open for sulfur linkage, $C_1$ and $C_2$ are carbon atoms included in radicals selected from the group consisting of (1) separate radicals selected from cycloaliphatic hydrocarbon radicals and aralkyl, halogenated alkyl and alkyl radicals and (2) a single radical selected from alkylene and oxygen-interrupted alkylene radicals containing both $C_1$ and $C_2$, $x$ is an integer from 1 to 4 and $n$ is any whole number including zero.

4. A process of reclaiming a vulcanized rubbery copolymer of styrene and 1,3-butadiene which comprises heating said vulcanized copolymer in the presence of (A) not more than about 25 parts by weight of a primary aliphatic amine, containing at least eight carbon atoms, per 100 parts by weight of said vulcanized copolymer and (B) not more than about 2.5 parts by weight of an aromatic amine sulfide having the formula:

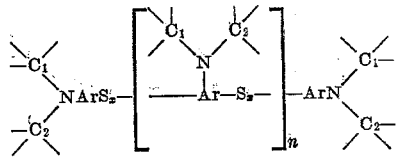

wherein Ar is an aromatic radical, N and S are directly connected to a ring of the aromatic radical, at least one position on said ring selected from positions ortho and para to N is open for sulfur linkage, $C_1$ and $C_2$ are carbon atoms included in radicals selected from the group consisting of (1) separate radicals selected from cycloaliphatic hydrocarbon radicals and aralkyl, halogenated alkyl and alkyl radicals and (2) a single radical selected from alkylene and oxygen-interrupted alkylene radicals containing both $C_1$ and $C_2$, $x$ is an integer from 1 to 4 and $n$ is any whole number including zero.

5. A process of reclaiming a mixture of vulcanized natural rubber and vulcanized rubbery copolymer of styrene and 1,3-butadiene which comprises heating said mixture in the presence of (A) not more than about 25 parts by weight of a primary aliphatic amine, containing at least eight carbon atoms, per 100 parts by weight of said mixture and (B) not more than about 2.5 parts by weight of an aromatic amine sulfide having the formula:

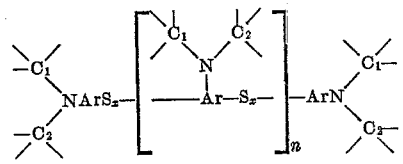

wherein Ar is an aromatic radical, N and S are directly connected to a ring of the aromatic radical, at least one position on said ring selected from positions ortho and para to N is open for sulfur linkage, $C_1$ and $C_2$ are carbon atoms included in radicals selected from the group consisting of (1) separate radicals selected from cycloaliphatic hydrocarbon radicals and aralkyl, halogenated alkyl and alkyl radicals and (2) a single radical selected from alkylene and oxygen-interrupted alkylene radicals containing both $C_1$ and $C_2$, $x$ is an integer from 1 to 4 and $n$ is any whole number including zero.

6. A process of reclaiming a vulcanized natural rubber which comprises heating said vulcanized natural rubber in the presence of (A) not more than about 25 parts by weight of a primary aliphatic amine, containing at least eight carbon atoms, per 100 parts by weight of said vulcanized rubber and (B) not more than about 2.5 parts by weight of an aromatic amine sulfide having the formula:

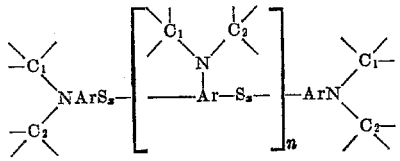

wherein Ar is an aromatic radical, N and S are directly connected to a ring of the aromatic radical, at least one position on said ring selected from positions ortho and para to N is open for sulfur linkage, $C_1$ and $C_2$ are carbon atoms included in radicals selected from the group consisting of (1) separate radicals selected from cycloaliphatic hydrocarbon radicals and aralkyl, halogenated alkyl and alkyl radicals and (2) a single radical selected from alkylene and oxygen-interrupted alkylene radicals containing both $C_1$ and $C_2$, $x$ is an integer from 1 to 4 and $n$ is any whole number including zero.

References Cited in the file of this patent

UNITED STATES PATENTS

| Number | Name | Date |
|---|---|---|
| 2,097,473 | Semon | Nov. 2, 1937 |
| 2,423,032 | Le Beau | June 24, 1947 |
| 2,470,945 | Paul | May 24, 1949 |
| 2,470,948 | Paul | May 24, 1949 |
| 2,502,150 | Hook | Mar. 28, 1950 |
| 2,530,355 | Hook | Nov. 14, 1950 |
| 2,581,919 | Albert | Jan. 8, 1952 |

FOREIGN PATENTS

| Number | Country | Date |
|---|---|---|
| 284,829 | Great Britain | Feb. 9, 1948 |

OTHER REFERENCES

"Reclaiming Agents for Synthetic Rubber," Ind. and Eng. Chem., vol. 40, No. 7, pages 1194–1202, July 1948.